United States Patent
Mougin et al.

(10) Patent No.: US 12,202,988 B2
(45) Date of Patent: Jan. 21, 2025

(54) PROCESS FOR PREPARING AQUEOUS GEL INKS WITH FIXED COLOR, AND AQUEOUS GEL INKS THEREOF

(71) Applicants: SOCIETE BIC, Clichy (FR); UNIVERSITE DE HAUTE ALSACE, Mulhouse (FR); CENTRE NATIONAL DE LA RECHERCHE SCIENTIFIQUE, Paris (FR)

(72) Inventors: Karine Mougin, Valdieu-Lutran (FR); Feriel Ghellal, Belfort (FR); Arnaud Spangenberg, Flaxlanden (FR); Romain Metillon, Combs la Ville (FR); Olivier Albenge, Mortcerf (FR)

(73) Assignees: SOCIETE BIC, Clichy (FR); UNIVERSITE DE HAUTE ALSACE, Mulhouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 783 days.

(21) Appl. No.: 17/296,201

(22) PCT Filed: Nov. 18, 2019

(86) PCT No.: PCT/EP2019/081633
§ 371 (c)(1),
(2) Date: May 21, 2021

(87) PCT Pub. No.: WO2020/104367
PCT Pub. Date: May 28, 2020

(65) Prior Publication Data
US 2022/0010153 A1      Jan. 13, 2022

(30) Foreign Application Priority Data
Nov. 22, 2018   (EP) .................................. 18306553

(51) Int. Cl.
*C09D 11/17*   (2014.01)
*B41J 2/21*   (2006.01)
(Continued)

(52) U.S. Cl.
CPC ............. *C09D 11/17* (2013.01); *B41J 2/2107* (2013.01); *C09D 11/30* (2013.01); *C09D 11/32* (2013.01); *C09D 11/328* (2013.01); *B82Y 40/00* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 6,171,381 B1 * 1/2001 Yoshimura ............. C09D 11/30
106/31.71
7,291,292 B2 11/2007 Ittel
(Continued)

FOREIGN PATENT DOCUMENTS

EP    0837113    4/1998
EP    2354193    8/2011
(Continued)

OTHER PUBLICATIONS

International Search Report dated Jan. 28, 2020 in related PCT International Patent Application No. PCT/EP2019/081573, 5 pgs.
(Continued)

*Primary Examiner* — Manish S Shah
(74) *Attorney, Agent, or Firm* — Ruggiero McAllister & McMahon LLC

(57) ABSTRACT

There is a process for preparing in situ an aqueous gel ink with fixed color having the following steps:
(i) preparing a gel-based matrix of aqueous ink comprising 4-(2-hydroxyethyl)-1-piperazineethanesulfonic acid as reducing agent, and
(Continued)

(ii) adding a solution of metallic salts to the gel-based matrix of aqueous ink prepared in step (i), to obtain an aqueous gel ink with fixed color with metallic nanoparticles dispersed therein.

There is also an aqueous gel ink with fixed color obtained according to the process of the disclosure, comprising 4-(2-hydroxyethyl)-1-piperazineethanesulfonic acid and metallic nanoparticles.

There is also a writing instrument comprising an aqueous gel ink with fixed color according to the disclosure.

19 Claims, 3 Drawing Sheets

(51) Int. Cl.
*B82Y 40/00* (2011.01)
*C09D 11/30* (2014.01)
*C09D 11/32* (2014.01)
*C09D 11/328* (2014.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 8,376,644 B2 | 2/2013 | Lugert et al. | |
| 8,870,998 B2 | 10/2014 | Berkei et al. | |
| 2013/0171345 A1 | 7/2013 | Sexton | |
| 2014/0168326 A1* | 6/2014 | Nariai | C09D 11/32 347/86 |
| 2015/0166807 A1* | 6/2015 | Komatsu | C09D 11/328 347/20 |
| 2015/0175825 A1* | 6/2015 | Yamazaki | C09D 11/38 106/31.77 |
| 2022/0275226 A1 | 9/2022 | Albenge et al. | |

FOREIGN PATENT DOCUMENTS

| | | |
|---|---|---|
| EP | 2547477 | 7/2016 |
| GB | 2372255 | 8/2002 |
| JP | 2012-251222 | 12/2012 |
| WO | 2006/072959 | 7/2006 |
| WO | 2012/077043 | 6/2012 |

OTHER PUBLICATIONS

Written Opinion dated Jan. 28, 2020 in related PCT International Patent Application No. PCT/EP2019/081573, 4 pgs.

Teyssier et al, "Photonic crystals cause active colour change in chameleons", Nature Communications 6, Article No. 6368, Mar. 10, 2015, 7 pgs.

International Search Report dated Jan. 31, 2020 in corresponding PCT International Patent Application No. PCT/EP2019/081633, 4 pgs.

Written Opinion dated Jan. 31, 2020 in corresponding PCT International Patent Application No. PCT/EP2019/081633, 5 pgs.

Rong Chen et al: "Fabrication of gold nanoparticles with different morphologies in HEPES buffer", Rare Metals, vol. 29, No. 2, Apr. 1, 2010 (Apr. 1, 2010), pp. 180-186.

The synthesis of SERS-active gold nanoflower tags for in vivo applications, ACS Nano, vol. 2, No. 12, Jan. 1, 2008 (Jan. 1, 2008), Abstract.

* cited by examiner

PROCESS FOR PREPARING AQUEOUS GEL INKS WITH FIXED COLOR, AND AQUEOUS GEL INKS THEREOF

CROSS REFERENCE TO RELATED APPLICATION(S)

This application is a National Stage Application of International Application No. PCT/EP2019/081633, filed on Nov. 18, 2019, now published as WO2020/104367 A1, which claims priority to European Application No. EP 18306553.1, filed on Nov. 22, 2018, the contents of which are incorporated herein by reference in their entireties.

FIELD OF THE DISCLOSURE

The present disclosure relates to a process for preparing in situ an aqueous gel ink with fixed color, and to aqueous gel inks with fixed color comprising 4-(2-hydroxyethyl)-1-piperazineethanesulfonic acid and metallic nanoparticles, obtained according to the process of the disclosure, and free from any dye and pigment. The disclosure also relates to a writing instrument comprising an aqueous gel ink with fixed color according to the disclosure.

SUMMARY OF THE DISCLOSURE

One of the main objectives of the present disclosure is to replace all types of dyes and pigments normally present in aqueous gel inks, which have the disadvantage of being irritating and to cause allergies.

To this end, the inventors have developed a specific process through which it is possible to obtain new aqueous gel inks with fixed color when writing by replacing former aqueous gel inks containing dyes and pigments by new ones that are nanoparticles-based. The process developed within the framework of the disclosure also presents the advantage of being performed in aqueous media, and therefore to be a "green process". In addition, the process of the disclosure is performed at low temperature ranges, works in an ecologically viable manner, and also takes account of ecological requirements.

The present disclosure relates to a process for preparing in situ an aqueous gel ink with fixed color comprising the following steps:
(i) preparing a gel-based matrix of aqueous ink comprising 4-(2-hydroxyethyl)-1-piperazineethanesulfonic acid as reducing agent, and
(ii) adding a solution of metallic salts to the gel-based matrix of aqueous ink prepared in step (i), to obtain an aqueous gel ink with fixed color with metallic nanoparticles dispersed therein.

DETAILED DESCRIPTION OF THE DISCLOSURE

Figure 1:
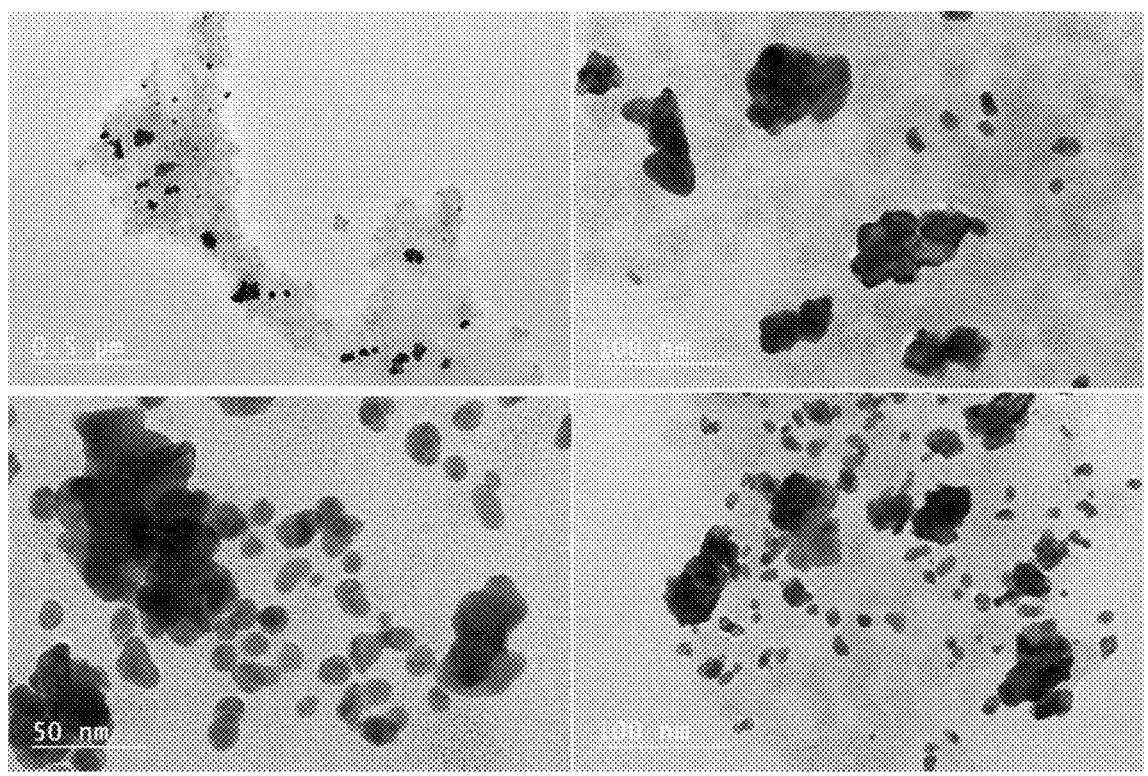
FIG. 1 shows TEM images of the gold nanoparticles dispersed in the gel-based matrix of aqueous ink comprising 4-(2-hydroxyethyl)-1-piperazineethanesulfonic acid.

In the sense of the disclosure, the term "in situ" means that the metallic nanoparticles present in the aqueous gel ink of the disclosure are synthetized directly in the gel-based matrix of the aqueous ink.

In the sense of the disclosure, the term "fixed color" means that the color of the aqueous gel ink of the disclosure is the same, by visual observation, before and after application on a media, in particular over a period of seven calendar days (one week).

According to a preferred embodiment of the disclosure, the media is an absorbing support wherein the absorbing support is a porous substrate, and more specifically an absorbing support chosen in the group consisting of paper, cardboard and textiles.

For the purposes of the present disclosure, the term "ink" is intended to mean a "writing ink" which is intended to be used in a writing instrument, and in particular in a pen. A writing ink should not be confused with a "printing ink" which is used in printing machines and which does not have the same technical constraints and thus the same specifications. Indeed, a writing ink must not contain solid particles of which the size is greater than the channels of the writing instrument, in order to avoid blocking them, which would inevitably lead to writing being irreversibly stopped. In addition, it must allow an ink flow rate suitable for the writing instrument used, in particular a flow rate of between 100 and 500 mg/200 m of writing, and advantageously between 150 and 400 mg/200 m of writing. It must also dry sufficiently rapidly to avoid smudging the writing medium. It must also avoid the problems of migration (bleeding) over time. Thus, the ink according to the present disclosure will be suitable for the writing instrument for which it is intended, in particular for a pen.

In addition, a "writing ink" must not be too fluid, so as to avoid leaks during writing. However, it must be sufficiently fluid to facilitate the flow of the writing action.

In the particular case of the disclosure, the writing ink being a "gel ink" (which corresponds therefore to a thixotropic ink), the viscosity measured at rest (at a shear rate of 0.01 s$^{-1}$) at 20° C. is different and in particular higher than the viscosity measured with a shear rate of 100 s$^{-1}$ at 20° C. using the same rheometer such as a cone-and-plate rheometer for example Malvern KINEXUS with a cone of 60 mm and an angle of 1°. In a particular embodiment, the viscosity of the gel ink according to the present disclosure measured under these conditions ranges from 1,000 to 7,000 mPa·s, advantageously from 2,000 to 5,000 mPa·s, and more advantageously from 2,500 to 3,500 mPa·s, with a shear rate of 1 s$^{-1}$, and advantageously from 5 to 50 mPa·s, more advantageously from 7 to 40 mPa·s, and still more advantageously from 10 to 20 mPa·s with a shear rate of 5,000 s$^{-1}$. Advantageously, such a viscosity is stable during storage for at least three months at 40° C. and 20% relative humidity, in particular the viscosity will not have a more than 50% decrease. More advantageously, the return to viscosity at rest after shear is very quick, advantageously at most a few minutes, in order to avoid the static leakage in the minutes after writing.

In the present disclosure, the gel-based matrix of aqueous ink prepared in step (i) may comprise from 50 to 95%, more specifically from 60 to 90%, and even more specifically from 70 to 85%, by weight of water.

The gel-based matrix of aqueous ink prepared in step (i) may also comprise classic gel ink ingredients such as solvents, antimicrobial agents, corrosion inhibitors, antifoam agents, rheology modifiers, etc. The gel ink ingredients used to prepare the gel-based matrix of aqueous ink of step (i) will be largely described below, in relation with the subject-matter of the aqueous gel ink with fixed color of the disclosure.

The reducing agent 4-(2-hydroxyethyl)-1-piperazineethanesulfonic acid may be added in the form of a solution or in the form of powder. The reducing agent reduces the metallic salts to elemental metal (i.e. oxidation state: 0).

In a preferred embodiment, the concentration of the reducing agent 4-(2-hydroxyethyl)-1-piperazineethanesulfonic acid in the gel-based matrix of aqueous ink of step (i) ranges from 0.1 to 2 $mol·L^{-1}$, more specifically from 0.2 to 1 $mol·L^{-1}$, and even more specifically 0.3 to 0.8 $mol·L^{-1}$.

In the present disclosure, the solution of metallic salts is advantageously a solution of gold salts ($Au^{3+}$), which is more advantageously a solution of gold (III) chloride trihydrate $HAuCl_4·3H_2O$. Metallic nanoparticles are formed when contacting the metallic salts with the reducing agent.

In a preferred embodiment, the concentration of metallic salts in the gel-based matrix of aqueous ink of step (ii) ranges from 0.0001 to 0.5 $mol·L^{-1}$, more specifically 0.001 to 0.1 $mol·L^{-1}$, and even more specifically 0.002 to 0.08 $mol·L^{-1}$.

The addition of a solution of metallic salts to the gel-based matrix of aqueous ink prepared in step (i) can be made:
 by continuous injection, to obtain lighter colored aqueous gel inks, or
 drop-by-drop, to obtain darker colored aqueous gel inks.

In a preferred embodiment, the metallic nanoparticles obtained in step (ii) are gold nanoparticles. In another preferred embodiment, the metallic nanoparticles have the shape of spheres or polyhedral shape, more specifically polyhedral shape, and even more specifically triangular, square, rectangular shapes.

In a preferred embodiment, the molar ratio between the metallic salts and the reducing agent 4-(2-hydroxyethyl)-1-piperazineethanesulfonic acid ranges from 0.1 to 20%, and more specifically from 1 to 15%.

The present disclosure also concerns an aqueous gel ink with fixed color obtained according to the process of the disclosure, the aqueous gel comprising 4-(2-hydroxyethyl)-1-piperazineethanesulfonic acid as reducing agent and metallic nanoparticles.

The 4-(2-hydroxyethyl)-1-piperazineethanesulfonic acid and the metallic nanoparticles are as defined above in relation with the subject-matter of the process of the disclosure.

In the aqueous gel ink with fixed color of the disclosure, the amount of reducing agent 4-(2-hydroxyethyl)-1-piperazineethanesulfonic acid advantageously ranges from 10 to 30%, and more advantageously from 12 to 25%, by weight relative to the total weight of the aqueous gel ink.

In the aqueous gel ink with fixed color of the disclosure, the metallic nanoparticles are advantageously gold nanoparticles. The metallic nanoparticles present in the aqueous gel ink with fixed color of the disclosure have more specifically the shape of spheres or polyhedral shape, even more specifically polyhedral shape, and even more specifically triangular, square, rectangular shapes.

In the aqueous gel ink with fixed color of the disclosure, the metallic nanoparticles of the disclosure have more specifically an average particle size ranging from 1 to 100 nm, and even more specifically from 10 to 60 nm. This average particle size is determined by analysis of 2D images (microscope: JEOL ARM 200), according to the standard ISO9001:2015.

According to a preferred embodiment, the distance between the metallic nanoparticles within the aqueous gel ink of the disclosure is lower than 100 nm, more specifically varies from 10 to 50 nm, and even more specifically varies from 15 to 30 nm.

In the aqueous gel ink with fixed color of the disclosure, the amount of metallic nanoparticles advantageously ranges from 0.001 to 0.1%, and more advantageously from 0.005 to 0.008%, by weight relative to the total weight of the aqueous gel ink.

In the aqueous gel ink with fixed color of the disclosure, the amount of water advantageously ranges from 50 to 95%, more advantageously from 60 to 90%, and even more advantageously from 70 to 85%, by weight relative to the total weight of the aqueous gel ink.

The aqueous gel ink with fixed color of the disclosure may also comprise classic gel ink ingredients such as solvents, antimicrobial agents, corrosion inhibitors, antifoam agents, rheology modifiers, as described below. These gel ink ingredients are added to the gel-based matrix of aqueous ink in step (i) of the process of the disclosure.

The aqueous gel ink of the disclosure may comprise a solvent. Among the solvents that can be used, mention may be made of polar solvents miscible in water such as:
 glycol ethers such as triethylene glycol, polyethylene glycol, diethylene glycol monoethyl ether, diethylene-glycol-mono butyl ether, dipropyleneglycol monobutyl ether, tripropylene glycol monomethyl ether, phenoxyethanol, phenoxypropanol,
 alcohols: linear or branched alcohol in $C_1$-$C_{15}$ such as isopropanol, butanol, isobutanol, pentanol, benzyl alcohol, glycerin, diglycerin, polyglycerin,
 esters such as ethyl acetate or propyl acetate,
 carbonate esters such as propylene carbonate or ethylene carbonate,
 ketones such as methylisobutylketone (MIBK), acetone or cyclohexanone, and
 mixtures thereof.

In a preferred embodiment, the solvent is chosen in the group consisting of glycol ethers, and more specifically is chosen in the group consisting of triethylene glycol, polyethylene glycol, diethylene glycol monoethyl ether, diethylene-glycol-mono butyl ether, dipropyleneglycol monobutyl ether, tripropylene glycol monomethyl ether, phenoxyethanol, phenoxypropanol, and mixture thereof. In a further advantageous embodiment the solvent is chosen in the group consisting of triethylene glycol, polyethylene glycol, and mixture thereof.

Advantageously, the solvent is present in the aqueous gel ink of the disclosure in an amount ranging from 5 to 35%, more advantageously from 9 to 30%, and even more advantageously from 11 to 25%, by weight relative to the total weight of the aqueous gel ink.

The aqueous gel ink of the disclosure may comprise an antimicrobial agent such as isothiazolinone (ACTICIDE® from Thor), more specifically chosen in the group consisting of 1,2-benzisothiazolin-3-one, 2-methyl-4-isothiazolin-3-one, and mixture thereof.

Advantageously, the antimicrobial agent is present in the aqueous gel ink of the disclosure in an amount ranging from 0.01 to 0.5%, and more advantageously from 0.1 to 0.2%, by weight relative to the total weight of the aqueous gel ink.

The aqueous gel ink of the disclosure may comprise a corrosion inhibitor, more specifically chosen in the group consisting of tolytriazole, benzotriazole, and mixture thereof.

Advantageously, the corrosion inhibitor is present in the aqueous gel ink of the disclosure in an amount ranging from 0.05 to 1%, more advantageously from 0.07 to 0.5%, and even more specifically from 0.08 to 0.15%, by weight relative to the total weight of the aqueous gel ink.

The aqueous gel ink of the disclosure may comprise an antifoam agent, more specifically a polysiloxane-based antifoam agent, and even more specifically an aqueous emulsion of modified polysiloxane (such as MOUSSEX® from Synthron, TEGO® Foamex from Evonik).

Advantageously, the antifoam agent is present in the aqueous gel ink of the disclosure in an amount ranging from 0.05 to 1%, more advantageously from 0.1 to 0.5%, and even more advantageously from 0.2 to 0.4%, by weight relative to the total weight of the aqueous gel ink.

The aqueous gel ink of the disclosure may comprise a rheology modifier capable of generating a gelling effect, more specifically chosen in the group consisting of xanthan gum, gum arabic, and mixture thereof.

Advantageously, the rheology modifier is present in an amount ranging from 0.08 to 2%, more specifically from 0.2 to 0.8%, and even more specifically from 0.3 to 0.6%, by weight relative to the total weight of the aqueous gel ink.

The aqueous gel ink with fixed color of the disclosure may also comprise other additives such as:
  pH regulators like sodium hydroxide and triethanolamine,
  lubricants,
  coalescing agents,
  crosslinking agents,
  wetting agents,
  plasticizers,
  antioxidants, and
  UV stabilizers.

When present, these additives are added to the gel-based matrix of aqueous ink in step (i) of the process of the disclosure.

The present disclosure also concerns a method of writing with an aqueous gel ink of fixed color comprising the step of writing onto a media, more specifically on an absorbing support wherein the absorbing support is a porous substrate, and more specifically on paper, cardboard, or textiles, with an aqueous gel ink with fixed color according to the disclosure.

After writing onto a media, more specifically onto an absorbing support wherein the absorbing support is a porous substrate, and more specifically onto paper, cardboard, or textiles, with the aqueous gel ink of fixed color of the disclosure, the distance between the metallic nanoparticles in the aqueous gel ink applied on the media is lower than 1 µm, more specifically varies from 1 nm to 500 nm, and even more specifically varies from 100 to 200 nm.

Finally, the present disclosure concerns a writing instrument comprising:
  an axial barrel containing the aqueous gel ink according to the disclosure, and
  a pen body which delivers the aqueous gel ink stored in the axial barrel.

The writing instrument of the disclosure may be chosen in the group consisting of gel pens, felt pens, correction fluid, markers, and more specifically gel pens.

In addition to the foregoing, the disclosure also comprises other provisions which will emerge from the additional description which follows, which relates to the preparation of aqueous gel inks with fixed color according to the process of the disclosure and comparative examples, as well as to FIGS. 1 to 6 which show Transmission Electron Microscopy (TEM) and Scanning Electron Microscopy (SEM) images of gold nanoparticles dispersed in the gel-based matrix of aqueous ink containing 4-(2-hydroxyethyl)-1-piperazineethanesulfonic acid or other reducing agents, prepared according to examples 1 and 2 and to comparative examples 1 and 2.

EXAMPLES

Example 1

Preparation of an Aqueous Gel Ink with Fixed Color Based on 4-(2-hydroxyethyl)-1-piperazineethanesulfonic acid and Gold Nanoparticles, According to the Process of the Present Invention In a first step (i), a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h 30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 1 mL of a solution of 4-(2-hydroxyethyl)-1-piperazineethanesulfonic acid (83264-100ML-F HEPES Buffer Solution Sigma-Aldrich) (1 M). The mixture was homogeneized with a homogeneizer mixer at a speed of 15 m·s$^{-1}$ during 2 minutes.

In a second step (ii), 100 µL of a solution of gold (III) chloride trihydrate (520918-1G Sigma-Aldrich) (100 mM) was introduced into the mixture at a speed of 400 rpm during 10 minutes.

When the addition of the solution of gold (III) chloride trihydrate was made by continuous injection, the color of the aqueous gel ink was blue.

When the addition of the solution of gold (III) chloride trihydrate was made drop-by-drop (one drop every 10 seconds), the color of the aqueous gel ink was purple.

Figure 2:
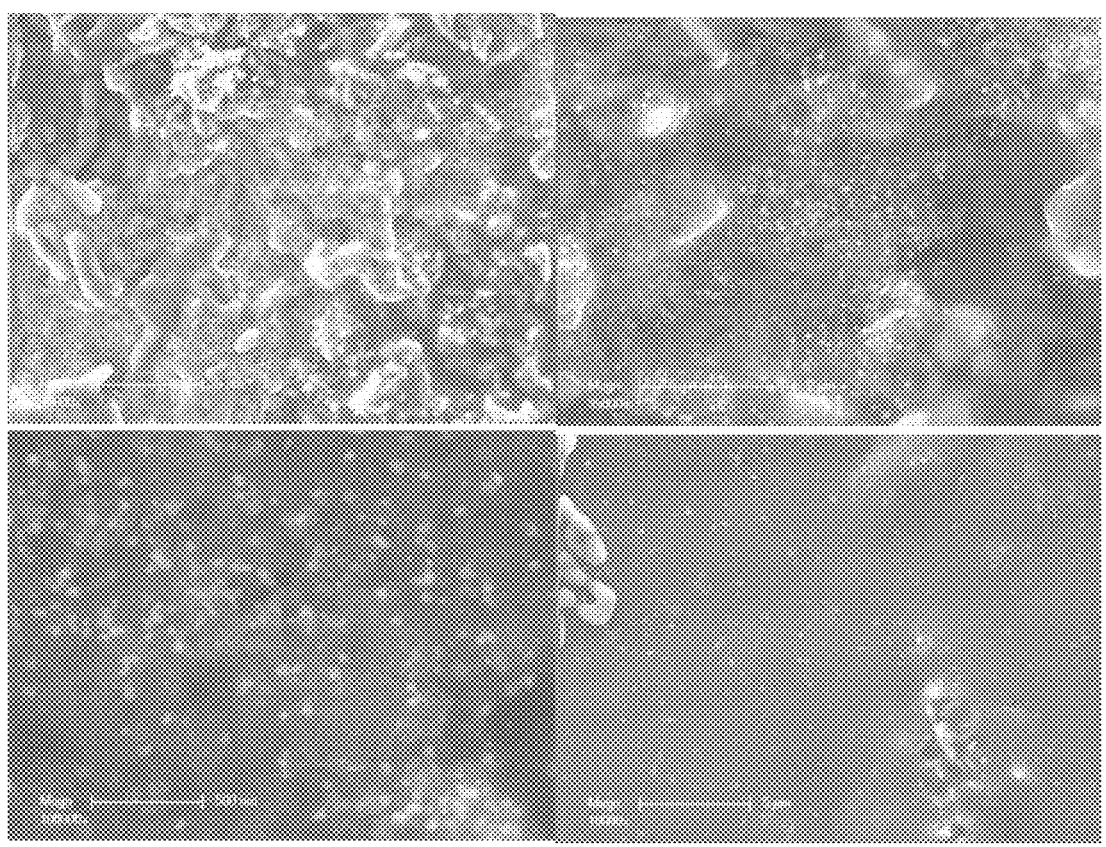
FIG. 2 shows SEM images of the gold nanoparticles once the aqueous gel ink is applied on a cellulosic paper A4 80 g·m$^{-2}$, when the addition was made by continuous injection.

FIG. 1 shows TEM images (apparatus: JEOL ARM200) of the gold nanoparticles dispersed in the gel-based matrix of aqueous ink comprising 4-(2-hydroxyethyl)-1-piperazineethanesulfonic acid and FIG. 2 shows SEM images (apparatus: MEB Philips XL30) of the gold nanoparticles once the aqueous gel ink is applied on a cellulosic paper A4

80 g·m$^{-2}$ (INACOPIA Elite), when the addition was made by continuous injection. The average particle size of the gold nanoparticles is of 50 nm.

Figure 3:
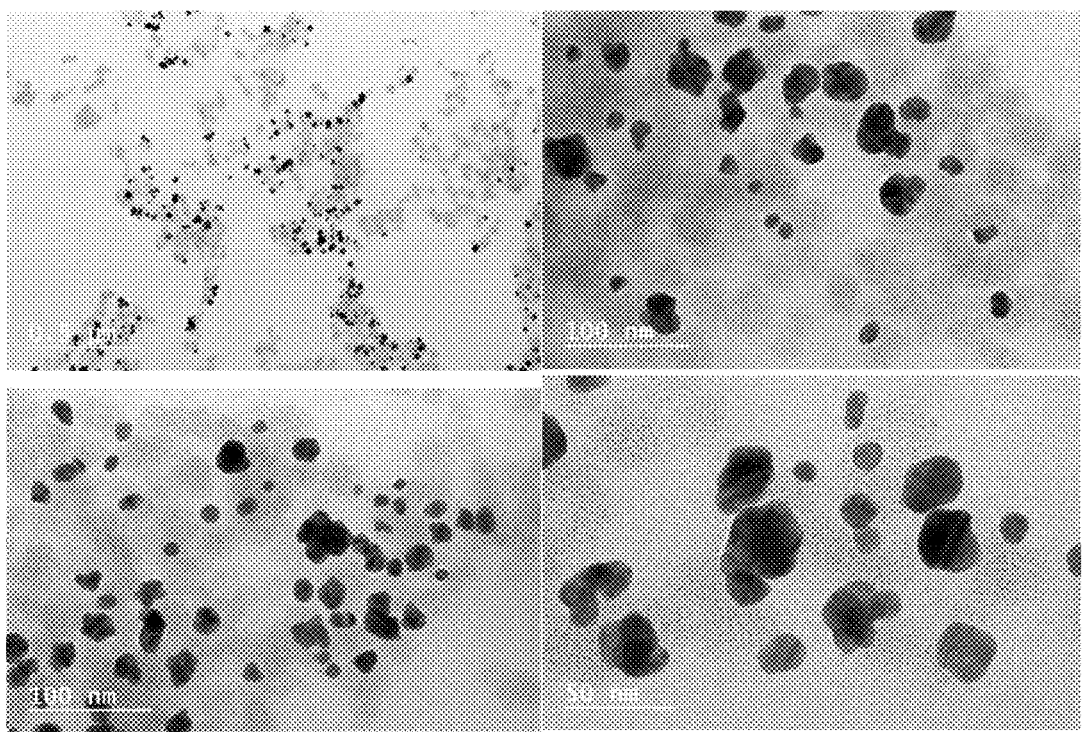
FIG. 3 shows TEM images of the gold nanoparticles dispersed in the gel-based matrix of aqueous ink comprising 4-(2-hydroxyethyl)-1-piperazineethanesulfonic acid.
Figure 4:
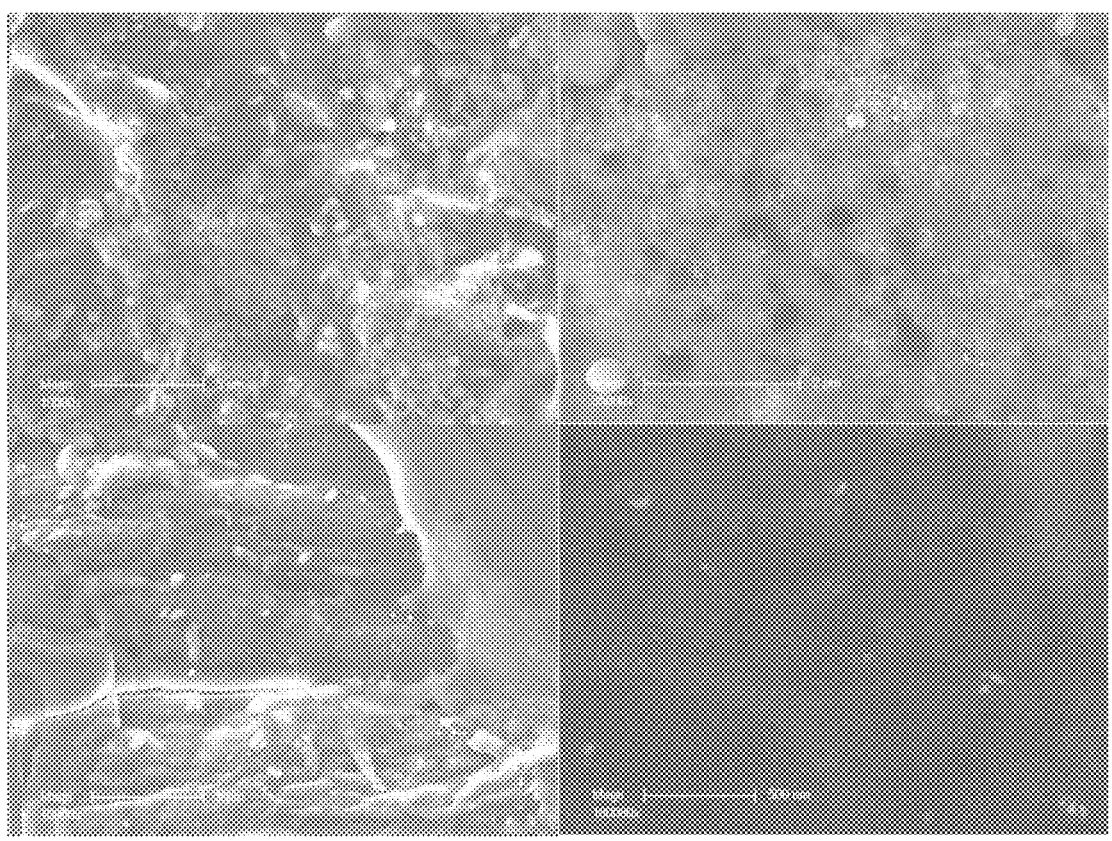
FIG. 4 shows SEM images of the gold nanoparticles once the aqueous gel ink is applied on a cellulosic paper A4 80 g·m$^{-2}$, when the addition was made drop-by-drop.

FIG. 3 shows TEM images (apparatus: JEOL ARM200) of the gold nanoparticles dispersed in the gel-based matrix of aqueous ink comprising 4-(2-hydroxyethyl)-1-piperazineethanesulfonic acid and FIG. 4 shows SEM images (apparatus: MEB Philips XL30) of the gold nanoparticles once the aqueous gel ink is applied on a cellulosic paper A4 80 g·m$^{-2}$ (INACOPIA Elite), when the addition was made drop-by-drop. The average particle size of the gold nanoparticles is of 30 nm.

When the obtained aqueous gel ink with fixed color was written on the cellulosic paper, the color appeared blue or purple (depending the introduction was made by continuous injection or drop-by-drop) and did not change after all.

Example 2

Preparation of an Aqueous Gel Ink with Fixed Color Based on 4-(2-hydroxyethyl)-1-piperazineethanesulfonic acid and Gold Nanoparticles, According to the Process of the Present Invention In a first step (i), a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogeneized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h 30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 0.14 g of 4-(2-hydroxyethyl)-1-piperazineethanesulfonic acid (HEPES 1M>99.5%, Reference: H3375, from Sigma-Aldrich). The mixture was homogeneized with a homogeneizer mixer at a speed of 15 m·s$^{-1}$ during 2 minutes.

In a second step (ii), 450 µL of a solution of gold (III) chloride trihydrate (520918-1G Sigma-Aldrich) (200 mM) was introduced into the mixture at a speed of 400 rpm during 20 minutes.

When the addition of the solution of gold (III) chloride trihydrate was made by continuous injection, the color of the aqueous gel ink was brown.

When the addition of the solution of gold (III) chloride trihydrate was made drop-by-drop (one drop every 30 seconds), the color of the aqueous gel ink was dark.

Figure 5:
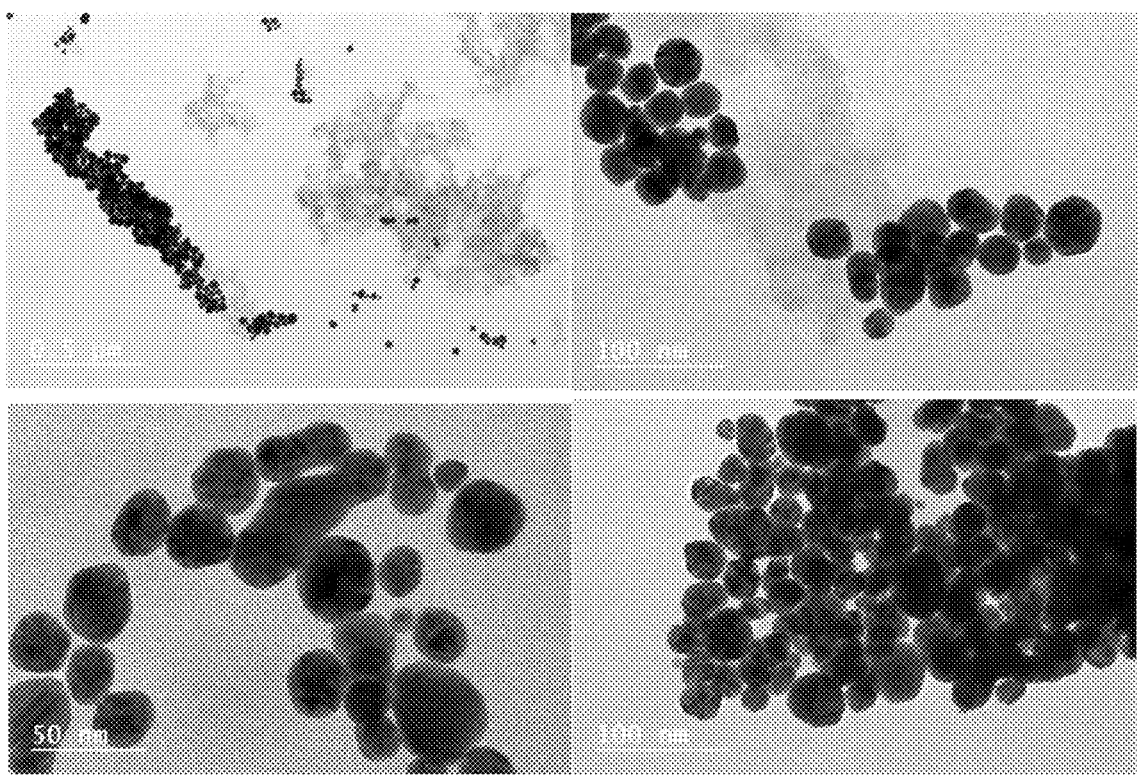
FIG. 5 shows TEM images of the gold nanoparticles dispersed in the gel-based matrix of aqueous ink comprising 4-(2-hydroxyethyl)-1-piperazineethanesulfonic acid.
Figure 6:
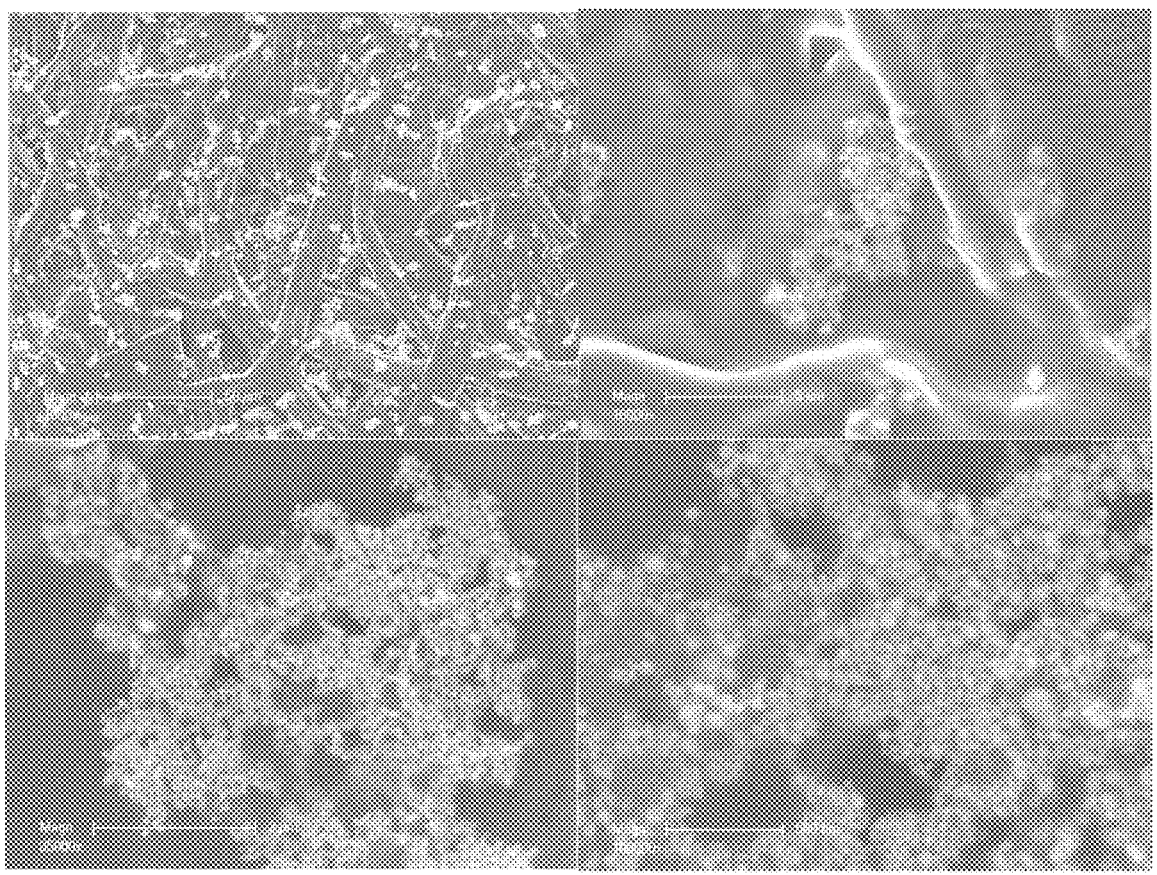
FIG. 6 shows SEM images of the gold nanoparticles once the aqueous gel ink is applied on a cellulosic paper A4 80 g·m$^{-2}$, when the addition was made drop-by-drop.

FIG. 5 shows TEM images (apparatus: JEOL ARM200) of the gold nanoparticles dispersed in the gel-based matrix of aqueous ink comprising 4-(2-hydroxyethyl)-1-piperazineethanesulfonic acid and FIG. 6 shows SEM images (apparatus: MEB Philips XL30) of the gold nanoparticles once the aqueous gel ink is applied on a cellulosic paper A4 80 g·m$^{-2}$ (INACOPIA Elite), when the addition was made drop-by-drop. The average particle size of the gold nanoparticles is of 40 nm.

When the obtained aqueous gel ink with fixed color was written on the cellulosic paper, the color appeared brown or dark (depending the introduction was made by continuous injection or drop-by-drop) and did not change after all.

Comparative Example 1

Preparation of an Aqueous Gel Ink Based on Glucose as Reducing Agent and Gold Nanoparticles (Without 4-(2-hydroxyethyl)-1-piperazineethanesulfonic acid)

In a first step, a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogenized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h 30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 200 µL of a solution of glucose (D(+)-GlucoseDextrose, Reference 410950010, from Acros Organics) (100 mM). The mixture was homogeneized with a homogeneizer mixer at a speed of 15 m·s$^{-1}$ during 2 minutes.

In a second step, 100 µL of a solution of gold (III) chloride trihydrate (520918-1G Sigma-Aldrich) (100 mM) was introduced into the mixture at a speed of 400 rpm during 10 minutes. After adding the solution of gold (III) chloride trihydrate, the color changed from transparent to yellow, and the composition gelled. The composition is too thick to be used in a pen.

Comparative Example 2

Preparation of an Aqueous Gel Ink Based on β-Cyclodextrin as Reducing Agent and Gold Nanoparticles (Without 4-(2-hydroxyethyl)-1-piperazineethanesulfonic acid)

In a first step, a gel-based matrix of aqueous ink was prepared by mixing 180 g of triethylene glycol (solvent), 48 g of polyethylene glycol (solvent), 2.3 g of Acticide® MBS (antimicrobial agent), and 1.20 g of Additin® RC8221 (corrosion inhibitor). The mixture was homogenized with a homogeneizer mixer at a speed of 15 m·s$^{-1}$ during 15 minutes and heated at a temperature of 35° C. Then, 5 g of xanthan gum (rheology modifier) was added to the mixture. The mixture was homogenized with a homogenizing mixer at a speed of 15 m·s$^{-1}$ during 15 minutes at a temperature of 35° C. 960 g of deionized water was slowly added to the mixture. The mixture was left to stand for 2 h 30. Then, 3.60 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 200 µL of a solution of β-cyclodextrin (C4767-25G Sigma-Aldrich) (100 mM). The mixture was homogeneized with a homogeneizer mixer at a speed of 15 m·s$^{-1}$ during 2 minutes.

In a second step, 100 μL of a solution of gold (III) chloride trihydrate (520918-1G Sigma-Aldrich) (100 mM) was introduced into the mixture at a speed of 400 rpm during 10 minutes. After adding the solution of gold (III) chloride trihydrate, the color changed from transparent to yellow, and the composition gelled. The composition is too thick to be used in a pen.

The invention claimed is:

1. A process for preparing in situ an aqueous gel ink with fixed color comprising the following steps:
    (i) preparing a gel-based matrix of aqueous ink comprising 4-(2-hydroxyethyl)-1-piperazineethanesulfonic acid as a reducing agent, and
    (ii) adding a solution of metallic salts to the gel-based matrix of aqueous ink prepared in step (i), to obtain an aqueous gel ink with fixed color with metallic nanoparticles dispersed therein,
    wherein the process is free of addition of a dye or pigment other than metallic nanoparticles.

2. The process according to claim 1, wherein the concentration of 4-(2-hydroxyethyl)-1-piperazineethanesulfonic acid in the gel-based matrix of aqueous ink of step (i) ranges from 0.1 to 2 mol·L$^{-1}$.

3. The process according to claim 1, wherein the solution of metallic salts is a solution of gold salts (Au$^{3+}$).

4. The process according to claim 1, wherein the concentration of metallic salts in the gel-based matrix of aqueous ink of step (ii) ranges from 0.0001 to 0.5 mol·L$^{-1}$.

5. The process according to claim 1, wherein the metallic nanoparticles obtained in step (ii) are metallic nanoparticles with the shape of spheres or polyhedral shape.

6. An aqueous gel ink with fixed color obtained according to the process of claim 1.

7. The aqueous gel ink according to claim 6, wherein the amount of 4-(2-hydroxyethyl)-1-piperazineethanesulfonic acid ranges from 10 to 30% by weight relative to the total weight of the aqueous gel ink.

8. The aqueous gel ink according to claim 6, wherein the metallic nanoparticles are gold nanoparticles.

9. The aqueous gel ink according to claim 6, wherein the metallic nanoparticles have an average particle size ranging from 1 to 100 nm.

10. The aqueous gel ink according to claim 6, wherein the amount of metallic nanoparticles ranges from 0.05 to 3% by weight relative to the total weight of the aqueous gel ink.

11. The aqueous gel ink according to claim 6, wherein the amount of water ranges from 50 to 95% by weight relative to the total weight of the aqueous gel ink.

12. The aqueous gel ink according to claim 6, wherein the distance between the metallic nanoparticles within the aqueous gel ink is lower than 100 nm.

13. The aqueous gel ink according to claim 6, further comprising a solvent chosen in the group consisting of glycol ethers.

14. The aqueous gel ink according to claim 6, further comprising an antimicrobial agent chosen in the group consisting of 1,2-benzisothiazolin-3-one, 2-methyl-4-isothiazolin-3-one, and mixture thereof.

15. The aqueous gel ink according to claim 6, further comprising a corrosion inhibitor chosen in the group consisting of tolytriazole, benzotriazole, and mixture thereof.

16. The aqueous gel ink according to claim 6, further comprising an antifoam agent.

17. The aqueous gel ink according to claim 6, further comprising a rheology modifier chosen in the group consisting of xanthan gum, gum arabic, and mixture thereof.

18. A writing instrument comprising:
    an axial barrel containing an aqueous gel ink with fixed color according to claim 6, and
    a pen body which delivers the aqueous gel ink stored in the axial barrel.

19. A writing instrument according to claim 18, selected from the group consisting of gel pens, felt pens, correction fluid, markers, and preferably gel pens.

* * * * *